(12) United States Patent
Jain et al.

(10) Patent No.: US 10,431,095 B2
(45) Date of Patent: *Oct. 1, 2019

(54) FORMULATING LANE LEVEL ROUTING PLANS

(71) Applicant: Ford Global Technologies, LLC, Dearborn, MI (US)

(72) Inventors: Jinesh J Jain, Palo Alto, CA (US); Daniel Levine, San Mateo, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 157 days.

This patent is subject to a terminal disclaimer.

(21) Appl. No.: 15/616,773

(22) Filed: Jun. 7, 2017

(65) Prior Publication Data
US 2017/0270800 A1    Sep. 21, 2017

Related U.S. Application Data

(63) Continuation of application No. 14/861,745, filed on Sep. 22, 2015, now Pat. No. 9,721,472.

(51) Int. Cl.
| | |
|---|---|
| G08G 1/16 | (2006.01) |
| G08G 1/0968 | (2006.01) |
| B60W 30/00 | (2006.01) |
| G01C 21/36 | (2006.01) |
| G05D 1/02 | (2006.01) |

(52) U.S. Cl.
CPC ............ G08G 1/167 (2013.01); B60W 30/00 (2013.01); G01C 21/3658 (2013.01); G05D 1/0212 (2013.01); G08G 1/096827 (2013.01); G08G 1/096844 (2013.01); G08G 1/096861 (2013.01)

(58) Field of Classification Search
CPC ............ G08G 1/167; G08G 1/096827; G08G 1/096844; G08G 1/096861; B60W 30/00; G05D 1/0212; G01C 1/3658
USPC .......................................................... 701/25
See application file for complete search history.

(56) References Cited

U.S. PATENT DOCUMENTS

| | | | |
|---|---|---|---|
| 6,944,538 B2 | 9/2005 | Ishibashi | |
| 7,006,950 B1 * | 2/2006 | Greiffenhagen | ............................ G08B 13/19604 382/107 |
| 7,899,617 B2 * | 3/2011 | Kawakami | ............. G01C 21/28 701/411 |
| 8,204,685 B2 | 6/2012 | Kang | |

(Continued)

*Primary Examiner* — Tuan C To
(74) *Attorney, Agent, or Firm* — David R. Stevens; Stevens Law Group

(57) ABSTRACT

The present invention extends to methods, systems, and computer program products for formulating lane level routing plans. In general, aspects of the invention are used in motorized vehicles to guide a driver to a terminal vehicle configuration according to a lane level routing plan that balances travel time with routing plan robustness. A lane level routing plan can be based on terminal guidance conditions (e.g., exiting a highway in the correct off ramp lane), statistical patterns of lanes themselves, current vehicle state, and state of the local environment near the vehicle. Lane level routing plans can be communicated to the driver with audio, visual, and/or haptic cues. Lane level routing plans can be revised online and in (essentially) real-time in response to changing conditions in the local environment (e.g., a trailing vehicle in a neighboring lane has decided to increase speed).

20 Claims, 5 Drawing Sheets

(56) References Cited

U.S. PATENT DOCUMENTS

| | | | | |
|---|---|---|---|---|
| 8,868,335 B2* | 10/2014 | Nowak | G01C 15/002 | 701/445 |
| 8,929,660 B2* | 1/2015 | Joshi | G08G 1/0104 | 382/191 |
| 9,816,825 B2* | 11/2017 | Sumizawa | G01C 21/3453 | |
| 9,964,414 B2* | 5/2018 | Slavin | G01C 21/3492 | |
| 9,988,047 B2* | 6/2018 | Johnson | B60W 30/12 | |
| 10,089,876 B1* | 10/2018 | Ramasamy | G08G 1/162 | |
| 2011/0109475 A1 | 5/2011 | Basnayake | | |
| 2013/0222127 A1* | 8/2013 | Ray Avalani | B60Q 9/008 | 340/436 |
| 2013/0311081 A1* | 11/2013 | Yamakawa | G01C 21/00 | 701/428 |
| 2013/0321615 A1* | 12/2013 | Schofield | B60Q 1/346 | 348/118 |
| 2014/0005923 A1* | 1/2014 | Bank | G01C 21/3658 | 701/424 |
| 2014/0188365 A1* | 7/2014 | Nagata | B60T 7/22 | 701/93 |
| 2014/0207325 A1* | 7/2014 | Mudalige | B62D 15/025 | 701/26 |
| 2014/0278052 A1 | 9/2014 | Slavin | | |
| 2015/0142207 A1* | 5/2015 | Flehmig | G01C 21/3492 | 701/1 |
| 2015/0213718 A1* | 7/2015 | Ono | B60Q 1/00 | 340/435 |
| 2015/0321665 A1* | 11/2015 | Pandita | G01C 21/28 | 701/409 |
| 2015/0325127 A1* | 11/2015 | Pandita | G08G 1/16 | 701/431 |
| 2016/0016585 A1* | 1/2016 | Park | B60W 30/12 | 701/41 |
| 2016/0057335 A1* | 2/2016 | Pisz | H04N 5/23206 | 348/149 |
| 2016/0258764 A1* | 9/2016 | Phuyal | G01C 21/26 | |
| 2016/0300491 A1* | 10/2016 | Fukuda | G08G 1/167 | |
| 2017/0352272 A1* | 12/2017 | Kodanna; Yuji | G01C 21/26 | |
| 2018/0319403 A1* | 11/2018 | Buburuzan | B62D 15/0255 | |

* cited by examiner

FORMULATING LANE LEVEL ROUTING PLANS

CROSS-REFERENCE TO RELATED APPLICATIONS

This application is a continuation of and claims the benefit of and priority to U.S. patent application Ser. No. 14/861,745, entitled "Formulating Lane Level Routing Plans", filed Sep. 22, 2015 by Jinesh J. Jain et al., the entire contents of which are expressly incorporated by reference.

BACKGROUND

1. Field of the Invention

This invention relates generally to operating motor vehicles, and, more particularly, to formulating lane level routing plans for traveling between vehicle configurations.

2. Related Art

Much of the cognitive overhead of operating a motor vehicle involves lane changing. A driver unfamiliar with a particular route may, in an effort to avoid missing a turn or highway off ramp, resort to making one or several quick lane changes. Quick lane changes are often unsafe for both the driver and for nearby vehicles. When making a lane change, at least two fundamental questions can be considered: (a) "What lane should I be in?" and (b) "When should I change lanes?". Due to the cognitive overhead associated with lane changes, some vehicles include navigation and route planning technologies. Navigation and route planning technologies assist a driver to reduce cognitive overhead on the driver.

These technologies fall into essential two categories: offline lane suggestion systems and warning systems. Offline lane suggestion systems can suggest a lane for a vehicle to move into. However, offline lane suggestion systems are typically unaware of which lane a vehicle is currently in and are not responsive to the local environment (e.g., do not account for actual lane usage). Additionally, suggestions are terminal conditions and do not provide a feasible plan for guiding the driver to the suggested lane. Warning systems can perform instantaneous blind spot detection to avert unsafe lane transitions. However, warning systems typically lack functionality for forward plans and are incapable of scheduling lane changes into the future.

BRIEF DESCRIPTION OF THE DRAWINGS

The specific features, aspects and advantages of the present invention will become better understood with regard to the following description and accompanying drawings where.

DETAILED DESCRIPTION

Figure 1:
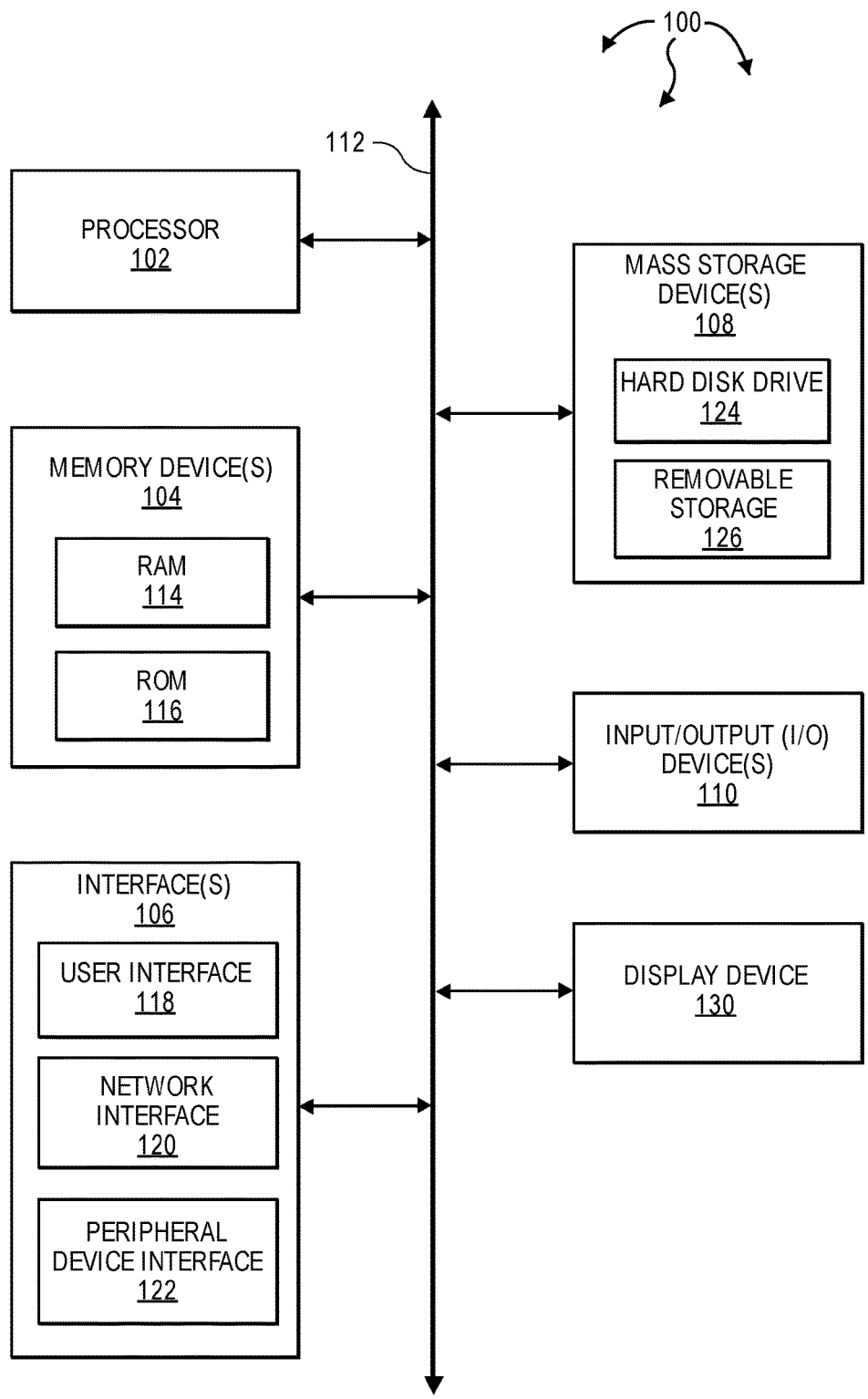
FIG. 1 illustrates an example block diagram of a computing device.

The present invention extends to methods, systems, and computer program products for formulating lane level routing plans.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Modules and data described with respect to the present invention can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112.

Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc, networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

In this description and the following claims, a "vehicle configuration" is defined as the configuration of a vehicle, including location, direction, speed, acceleration/deceleration, lane of a multi-lane road, etc.

In this description and the following claims, a "routing plan" is defined as a planned route for taking a vehicle from one vehicle configuration to another vehicle configuration separated by a distance. The distance between the one configuration and the other configuration can be divided into one or more route segments. Each route segment can correspond to particular features of the planned route, such as, for example, part of a particular road, an intersection, an interstate highway exchange, a point of interest (e.g., a building, a monument, a park, etc.).

In this description and the following claims, a "lane level routing plan" is defined as a routing plan that includes scheduled lane transitions on route segments corresponding to roads with multiple lanes in the same direction (e.g., an interstate highway).

In general, aspects of the invention are used in motorized vehicles to guide a driver to a terminal vehicle configuration according to a lane level routing plan that balances travel time with routing plan robustness. A motorized vehicle can be human driven or can be autonomous. A lane level routing plan can be based on terminal guidance conditions (e.g., exiting a highway in the correct off ramp lane), statistical patterns of lanes themselves, current vehicle state, and state of the local environment near the vehicle. Lane level routing plans can be communicated to the driver with audio, visual, and/or haptic cues. Lane level routing plans can be revised online and in (essentially) real-time in response to changing conditions in the local environment (e.g., a trailing vehicle in a neighboring lane has decided to increase speed).

A lane level routing plan for a vehicle can be formulated from a combination of spatiotemporal modeling and constrained motion planning. The lane level routing plan can be modeled from (possibly time-parameterized) statistics of lane usage data, such as for example, speed profiles of traversing vehicles and frequency and/or difficulty of lane transitions into and out of a lane and modulated by events that occur in the vicinity of the vehicle. A motion planner that generates feasible candidate trajectories in a local environment can be used to evaluate when and for how long a lane change cue should be indicated to a driver.

Formulation of a lane level routing plan can be based on a characterization of the free configuration space and of terminal constraint satisfaction. For characterization of the free configuration space, it is useful to model the behavior of vehicles in the current and adjacent lanes and directly characterize longitudinal gaps between vehicles in a particular lane. Any particular gap may accelerate and deform due to differences in behavior the vehicle(s) bounding it. Essentially, one is planning in a world of "bubbles" (i.e., gaps between other vehicles that expand and contract). With an essentially unlimited sensing horizon, a current belief over bubble accelerations/deformations can be propagated forward in time to derive expected travel times and probabilities of satisfying terminal constraints.

When planning with a limited sensing footprint, the probability of satisfying terminal constraints can be derived from the underlying birth-death process that gives rise to bubbles of free space. The birth-death process can consider road topology, visibility, driver comfort, fuel economy, weather, and macroscopic traffic patterns. Thus, under some conditions for a specified time of day, it is possible the birth-death process can be summarized from statistics of historical data. Scalar field estimation (possibly nonparametric) can be used as a "prior" on the permissibility of being in a particular lane (as a function of time, longitudinal position, velocity, etc.) in regions outside of the sensing footprint.

Figure 2:
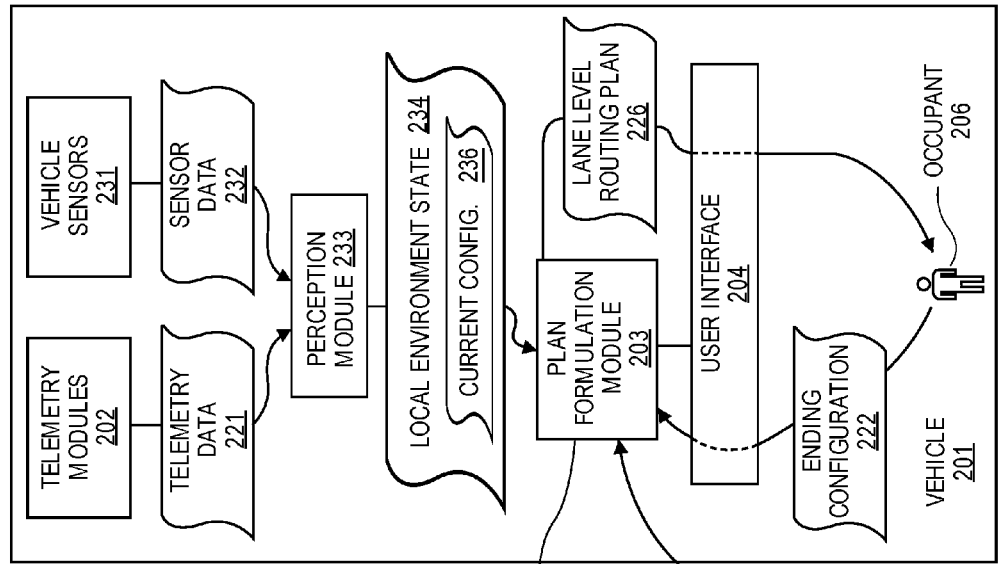
FIG. 2 illustrates an example computer architecture that facilitates formulating lane level routing plans.
Figure 2:
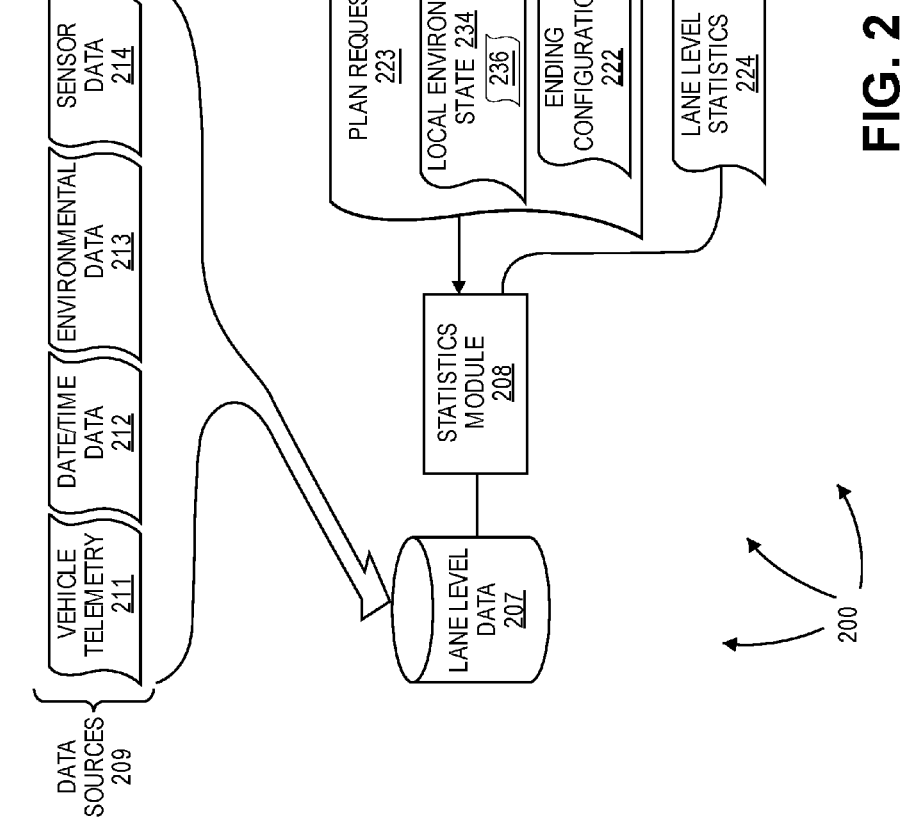

FIG. 2 illustrates an example computer architecture 200 that facilitates formulating a lane level routing plan. Referring to FIG. 2, computer architecture 200 includes vehicle 201, lane level data 207, statistics module 208, and data sources 209. Each of vehicle 201, lane level data 207, statistics module 208, and data sources 209 as well as their respective components can be connected to one another over (or be part of) a network, such as, for example, a PAN, a LAN, a WAN, and even the Internet. Accordingly, each of vehicle 201, lane level data 207, statistics module 208, and data sources 209 as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

As depicted, data sources 209 include vehicle telemetry 211, data/time data 212, environmental data 213, and sensor data 214. Data sources 209 can be stored in a cloud computing environment. Data stored in the cloud computing environment can be collected from a variety of sources, including motor vehicles, traffic data services, weather services, traffic cameras, public safety services, etc. Vehicle telemetry 211 can include telemetry for a plurality of motor vehicles. Vehicle telemetry 211 can include virtually any data that can be sensed for a motor vehicle, such as, for example, location, direction of travel, speed, acceleration, wipers, turn signals, etc. Date/time date 212 can be used to time/date stamp data from other data sources with the date/time the data was stored in lane level data 207. Environment data can include weather data, road construction data, traffic density, etc. Sensor data 214 can include data sensed from roadways, including images sensed using cameras and/or LIDAR.

For roads having multiple lanes for the same direction of travel, data from data sources 209 can be partitioned and maintained on a per lane basis.

Statistics module 208 is configured to receive requests for lane level routing plans from motor vehicles. Statistics module 208 accesses lane level data relevant to routing plan requests and calculates lane level statistics from relevant lane level data. Statistics module 208 then returns the lane level statistics back to the requesting motor vehicle. Statistics module 208 can aggregate statistics from different data sources with one another.

As depicted, vehicle 201 incudes telemetry modules 202, vehicle sensors 231, perception module 233, plan formulation module 203, user interface 204 and occupant 206 (e.g., a driver or passenger). Telemetry modules 202 can generate telemetry indicating the configuration of vehicle 201 including location, direction of travel, speed, acceleration, wipers, turn signals, etc. Vehicle sensors 231 can include sensors that sense data about other vehicles in the vicinity of vehicle 201. Vehicles sensors 231 can include cameras, radar, LIDAR, etc. Perception module 233 is configured to determine the state of a local environment around vehicle 201 based on the configuration of vehicle 201 and sensed data about other vehicles in the vicinity of vehicle 201.

Plan formulation module 203 is configured to formulate a lane level routing plan for vehicle 201. Plan formulation module 203 can determine a local environment state from perception module 233. A local environment state can indicate current configuration of vehicle 201 as well as at least some characteristics of any other vehicles in the vicinity of vehicle 201. Plan formulation module 203 can receive an occupant entered ending configuration from an occupant through user interface 204. The current configuration and ending configuration can be separated by some specified distance over one or more roads.

Alternately, when vehicle 201 is autonomous or semi-autonomous (including any levels of automation defined by National Highway Traffic Safety Administration (NHTSA)), an ending configuration can be received remotely or calculated at vehicle 201 according to an algorithm. When vehicle 201 is autonomous or semi-autonomous, vehicle 201 may operate in accordance with a specified mission, such as, for example, to pick up a passenger at a specified location. When circumstances associated with the mission change, vehicle 201 can take measures to adapt to the changed circumstances. For example, if after sitting in a loading zone for close to a maximum time without detecting the passenger, vehicle 201 may decide to drive around the block to avoid violation of parking regulations. As such, vehicle 201 can compute an ending configuration to drive around the block.

Plan formulation module 203 can generate a plan request including the local environment state and the ending configuration. Plan formulation module 203 can send the plan request to statistics module 208. Plan formulation module 203 can subsequently receive relevant lane level statistics from statistics module 208. Plan formulation module 203 can formulate a lane level routing plan from the relevant lane level statistics. The lane level routing plan can include lane changes predicted to be of benefit during travel between the current configuration and ending configuration over the one or more roads. A lane change can include changing between lanes on a multi-lane highway, moving into an off ramp or on ramp, etc.

In one aspect, at least one of the one or more roads is a multi-lane road having multiple lanes in the same direction of travel. A predicted lane change can be for changing between different lanes on a multi-lane road.

Plan formulation module 203 can present a lane level routing plan to a vehicle occupant through user interface 204. User interface 204 can be presented at a display device. In one aspect, user interface 204 is presented at a touch screen display device. Commands and data (e.g., an ending vehicle configuration) can be entered into plan formulation module 203 through the touch screen display device. Even when the vehicle is autonomous or semi-autonomous, a lane level routing plan can be presented at user-interface 204. Thus, an occupant can approve a lane level routing plan even when the occupant is to have limited control or no control over operation of vehicle 201. When there is no occupant of vehicle 201, a lane level routing plan may not be presented at user interface 204.

Figure 3:
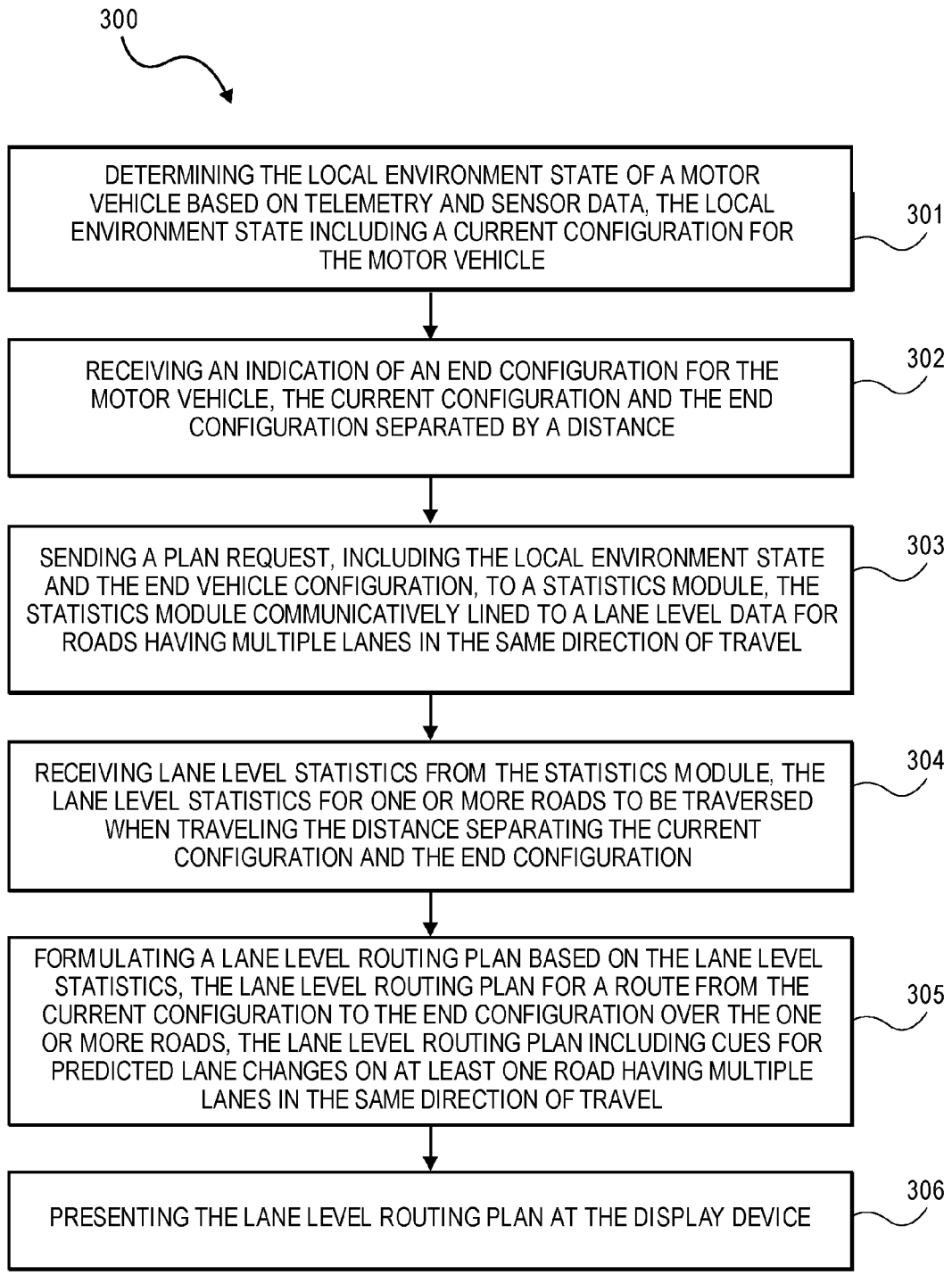
FIG. 3 illustrates a flow chart of an example method for formulating a lane level routing plan.

FIG. 3 illustrates a flow chart of an example method 300 for formulating a lane level routing plan. Method 300 will be described with respect to the components and data of computer architecture 200.

Method 300 includes determining the local environment state of a motor vehicle based on telemetry and sensor data, the local environment state including a current configuration for the motor vehicle (301). For example, perception module 233 can receive telemetry data 221 from telemetry modules 202 and can receive sensor data 232 from vehicle sensors 231. Perception module 233 can compute local environment state 234 from telemetry data 221 and sensor data 232. Local environment state 234 can include a current configuration 236 of vehicle 201 as well as information about other vehicles in the vicinity of vehicle 201.

Method 300 includes receiving an indication of an end configuration for the motor vehicle, the current configuration and the end configuration separated by a distance (302). For example, plan formulation module 203 can receive ending configuration 222 (for vehicle 202) from occupant 206 through user interface 204. Current configuration 236 and ending configuration 222 can be separated by a specified distance over one or more roads, including at least one multi-lane road having multiple lanes in the same direction of travel. Alternately, for example, when vehicle 201 is an autonomous or semi-autonomous motor vehicle, ending configuration 222 can be computed algorithmically based on a mission for vehicle 201.

Method 300 includes sending a plan request, including the local environment state and the end configuration, to a statistics module, the statistics module communicatively linked to lane level data for roads having multiple lanes in the same direction of travel (303). For example, plan formulation module 203 can send plan request 223 to statistics module 208. Plan request 223 includes local environment state 234 and ending configuration 222.

Statistics module 208 can use local environment state 234 and ending configuration 222 to identify lane level data relevant to plan request 223. In one aspect, statistics module 208 identifies lane level data for one or more roads to be traversed when traveling the distance separating current configuration 236 and ending configuration 222. Statistics module 208 calculates lane level statistics 224 from the relevant lane level data. Statistics module 208 sends lane level statistics 224 to vehicle 201. Lane level statistics 224 can be statistics representative of aggregate traffic patterns on roads to be traveled between current configuration 236 and ending configuration 222.

Method 300 includes receiving lane level statistics from the statistics module, the lane level statistics for one or more roads to be traversed when traveling the distance separating the current configuration and the end configuration (304). For example, vehicle 201 can receive lane level statistics 224 from statistics module 208.

Method 300 includes formulating a lane level routing plan based on the lane level statistics, the lane level routing plan for a route from the current configuration to the end configuration over the one or more roads, the lane level routing plan including cues for predicted lane changes on at least one road having multiple lanes in the same direction of travel (305). For example, plan formulation module 203 can formulate lane level routing plan 226 from lane level statistics 224. Lane level routing plan 226 (i.e., a schedule for making lane changes) is for a route from current configuration 236 to ending configuration 222. Lane level routing plan 226 includes cues for predicted lane changes on at least one multi-lane road that is traversed when traveling between current configuration 236 and ending configuration 222. The cues can then be presented to occupant 206 to indicate when predicted lane changes are to occur.

Method 300 includes presenting the lane level routing plan at the display device (306). For example, lane level routing plan 226 can presented to occupant 206 through user interface 204. In one aspect, lane level routing plan 226 is overlaid on a map at user interface 204. User interface 204 can be presented on a (e.g., touch screen) display device within vehicle 201. Lane level routing plan 226 can define a series of lane transitions for vehicle 201. The series of lane transitions can move vehicle 201 through a series of vehicle configurations from a starting configuration, through one or more intermediate configurations, to a terminal configuration.

Occupant 206 can review and approve lane level routing plan 226. Alternately, occupant 206 may disapprove of the lane level routing plan 226. When lane level routing plan 226 is disapproved, a new lane level routing plan can be formulated.

When there are no occupants in vehicle 201, plan formulation module 203 may generate lane level routing plan 226 without cues and may refrain from presenting lane level routing plan 226 at user interface 204 on the display device.

Plan formulation module 203 can also take into consideration user based cost functions, such as, for example, a preference for reduced travel time, reduced fuel consumption, safety, less traffic, better visibility, etc., when formulating a lane level routing plan. Plan formulation module 203 can also take into consideration user based constraints, such as, for example, probability of actually reaching a terminal configuration.

Plan formulation module 203 can balance different cost functions and/or constraints when formulating a lane level routing plan. For example, a first lane level routing plan may have reduced travel time but only a 95% chance of reaching a terminal configuration (without subsequent correction). A second lane level routing plan may have somewhat greater travel time but have a 98% chance of reaching a terminal configuration (without subsequent correction). As such, plan formulation module 203 can balance reduced travel time against probability for actually reaching a terminal configuration when determining to select the first or second lane level routing plan.

Figure 4B:
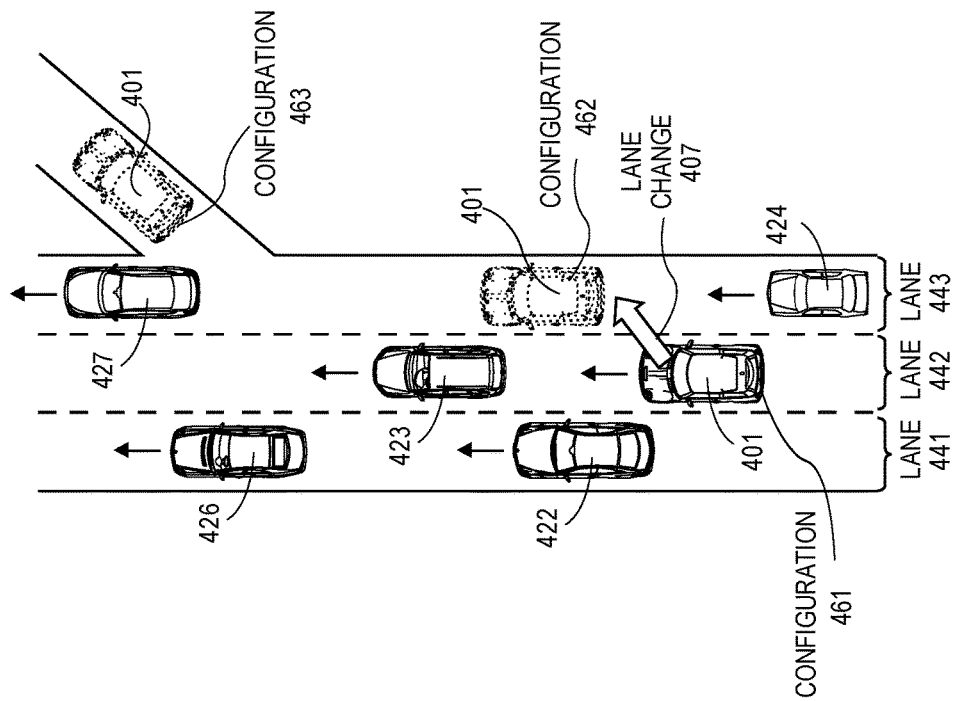
FIG. 4B illustrates an example of cars traveling in different lanes of a multi-lane road.
Figure 4A:
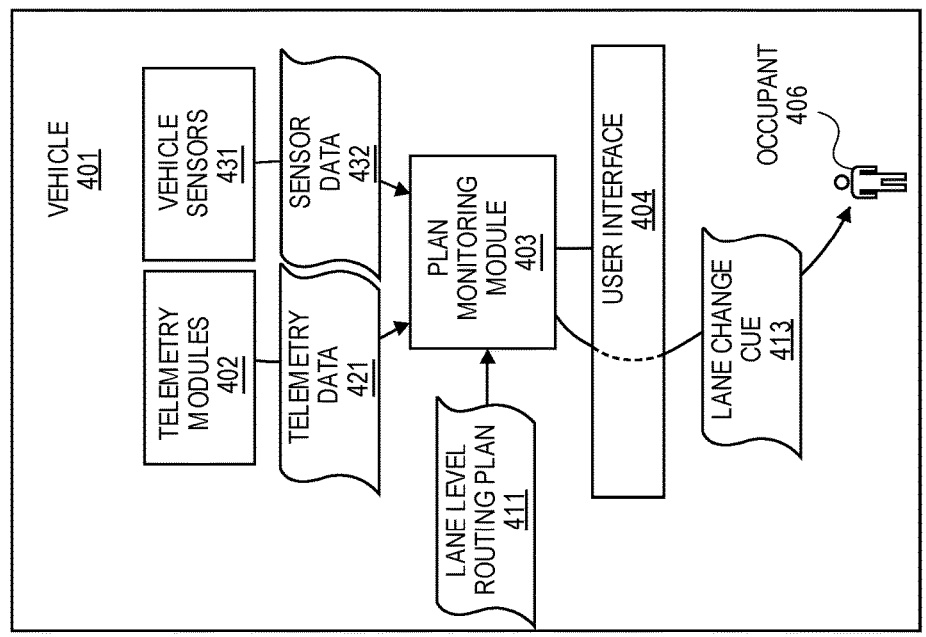
FIG. 4A illustrates an example computer architecture for implementing a lane level routing plan.

Turning to FIG. 4A, FIG. 4A illustrates an example computer architecture for implementing a lane level routing plan. FIG. 4A includes vehicle 401 (e.g., a motor vehicle). Vehicle 401 further includes plan monitoring module 403, telemetry modules 402, vehicle sensors 431, user interface 404, and occupant 406. Plan monitoring module 403, telemetry modules 402, vehicle sensors 431, and user interface 404 can be networked within vehicle 401 as well as be communicatively coupled over a network to other components outside of vehicle 401. Plan monitoring module 403 can send telemetry 421 to plan monitoring module 403. Vehicle sensors 431 can send sensor data 432 to plan monitoring module 403. Plan monitoring module 403 can receive telemetry data 421 and sensor data 432. Plan monitoring module 403 monitors the progress of lane level routing plans and alerts occupant 406 when predicted lane changes are to occur. When a predicted lane change is to occur, plan monitoring module 403 can indicate an appropriate lane change cue on user interface 404.

Thus, when a human is driving vehicle 401, a lane level route is indicated with cues. If a planned lane transition is feasible, a cue can fire to the human. The human can choose to ignore that cue, in which case plan monitoring module 403 and/or plan formulation module 202 can adapt. If vehicle 401 is self-driving, then finalized plans are passed to an execution module that actuates vehicle 401 according to the prescribed motion plan. If vehicle 401 has a human occupant, the routing plan may be displayed for approval or modification. Alternately, when vehicle 401 has no occupants (e.g., when vehicle 401 is autonomous), cues may not be presented at a user interface.

FIG. 4B illustrates an example of cars traveling in different lanes of a multi-lane road. Turning to FIG. 4B, cars 422 and 426 are in lane 441. Cars 401 and 423 are in lane 442. Cars 424 and 427 are in lane 443. As indicated by the arrows, all of the cars depicted in FIG. 4B are generally traveling in the same direction. Vehicle 401 can be proceeding in accordance with lane level routing plan 411.

Figure 5:
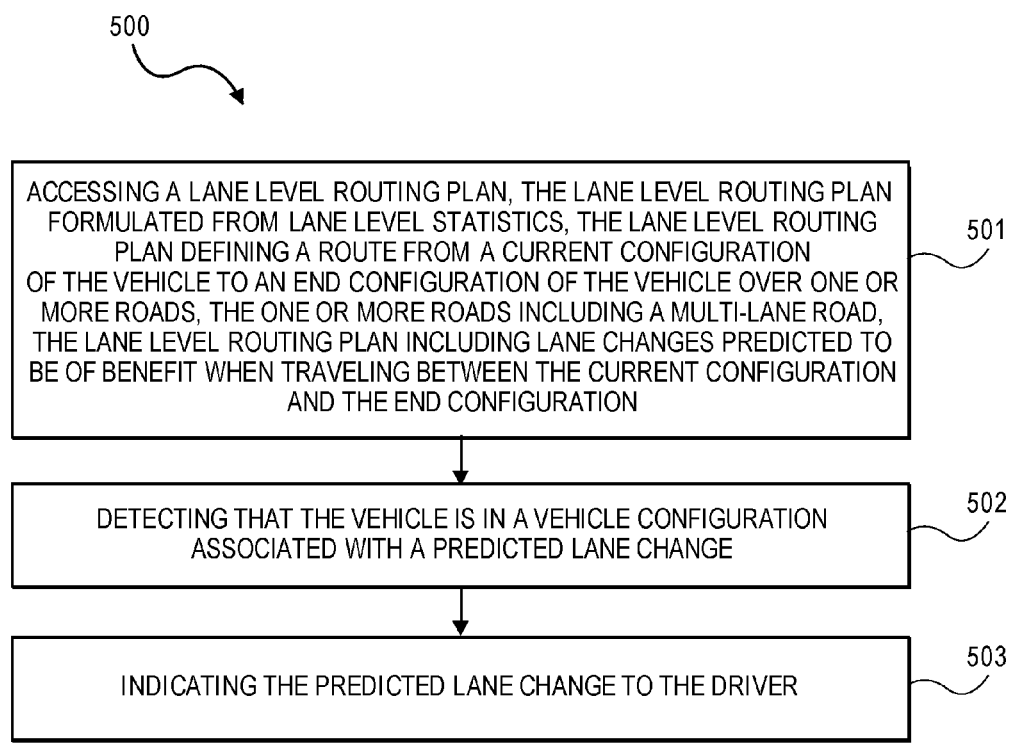
FIG. 5 illustrates a flow chart of an example method for implementing a lane level routing plan.

FIG. 5 illustrates a flow chart of an example method 500 for implementing a lane level routing plan. Method 500 will be described with respect to the components, data, and vehicles depicted in FIGS. 4A and 4B.

Method 500 includes accessing a lane level routing plan, the lane level routing plan formulated from lane level statistics, the lane level routing plan defining a route from a current vehicle configuration of the vehicle to an end vehicle configuration of the vehicle over one or more roads, the one or more roads including the multi-lane road, the lane level routing plan including lane changes predicted to be of benefit when traveling between the current vehicle configuration and the end vehicle configuration (501). For example, plan monitoring module 403 can access lane level routing plan 411. For vehicle 401, lane level routing plan 411 can define a route through one or more prior configurations, to configuration 461, to configuration 462, and to configuration 463 (an off ramp) over one or more roads, including a multi-lane road. Lane level routing plan 411 can include lane changes predicted to be of benefit to occupant 406 (e.g., based on defined cost functions and constraints) when traveling through the one or more prior configurations, to configuration 461, to configuration 462, and to configuration 463. Each lane change is associated with an intermediate configuration of vehicle 401 during travel between the one or more prior configurations, configuration 461, configuration 462, and configuration 463. Lane level routing plan 411 can be formulated from lane level statistics returned from a statistics module (e.g., like statistics module 208).

Method 500 includes detecting that the vehicle is in a configuration associated with a predicted lane change (502). For example, plan monitoring module 403 can detect that vehicle 401 is in configuration 461. Configuration 461 can be associated with predicted lane change 407.

Method 500 includes indicating the predicted lane change to the driver (503). For example, plan monitoring module 403 can send lane change cue 413 through user interface 404 to occupant 406. Lane change cue 413 can include audio, visual, and/or haptic cues. Occupant 406 can then implement lane change 407 to move from configuration 461 to configuration 462. If occupant 406 decides not to implement lane change 407, plan monitoring module 403 can adapt, possibly changing lane level routing plan 411.

If vehicle 401 is self-driving, instructions for implementing lane change 407 can be sent to an execution module instead of indicating lane change 407 to the driver. The execution module can then actuation vehicle controls to implement lane change 407.

Subsequently, another lane change can be implemented to move to configuration 463.

If vehicle 401 does not implement lane change 407 in a timely manner, it may be more difficult for vehicle 401 to subsequently transition to configuration 463. Instead vehicle 401 can end up in the location of vehicle 427. Thus, failure to robustly plan lane level routes and transitions can result in vehicle 401 not satisfying a terminal configuration (e.g., missing an exit from the highway).

Accordingly, aspects of the invention permit a vehicle operator to better plan for uncertainty when a vehicle is traveling between different configurations.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:
1. A system, the system comprising:
one or more processors;
system memory, the system memory storing instructions that are executable by the one or more processors; and the one or more processors executing the instructions stored in the system memory to:
- access lane level statistics defining statistics per lane of one or more roads;
- formulate a lane level routing plan from the lane level statistics, the lane level routing plan defining a route from a current configuration of a vehicle to an end configuration of the vehicle over the one or more roads, the one or more roads including a multi-lane road, the lane level routing plan including predicted lane changes during travel between the current configuration and the end configuration;
- detect that the vehicle is in a configuration associated with a predicted lane change; and
- indicate the predicted lane change to the driver.

2. The system of claim 1, wherein the one or more processors executing the instructions stored in the system memory to access lane level statistics comprises the one or more processors executing the instructions stored in the system memory to:
- send a plan request, including a local environment state of the vehicle and the end configuration, to a statistics module; and
- receive the lane level statistics from statistics module.

3. The system of claim 1, wherein the one or more processors executing the instructions stored in the system memory to formulate a lane level routing plan from the lane level statistics comprises the one or more processors executing the instructions stored in the system memory to formulate a lane level routing plan from the lane level statistics for the one or more roads including the multi-lane road.

4. The system of claim 1, wherein the one or more processors executing the instructions stored in the system memory to formulate a lane level routing plan from the lane level statistics comprises the one or more processors executing the instructions stored in the system memory to formulate a lane level routing plan including lane changes predicted to increase the efficiency of travel between the current configuration and the end configuration.

5. The system of claim 1, wherein the one or more processors executing the instructions stored in the system memory to formulate a lane level routing plan comprises the one or more processors executing the instructions stored in the system memory to formulate a schedule of a plurality of predicted lane changes.

6. The system of claim 1, wherein the one or more processors executing the instructions stored in the system memory to indicate the predicted lane change to the driver comprises the one or more processors executing the instructions stored in the system memory to present a cue to alert an occupant of the vehicle.

7. The system of claim 6, wherein the one or more processors executing the instructions stored in the system memory to present a cue to alert an occupant of the vehicle comprises the one or more processors executing the instructions stored in the system memory to present one or more of: an audio cue, a video cue, and a haptic cue.

8. The system of claim 1, further comprising the one or more processors executing the instructions stored in the system memory to receive at least of: telemetry data and sensor data indicative of the current configuration.

9. The system of claim 1, wherein the one or more processors executing the instructions stored in the system memory to indicate the predicted lane change to the driver comprises the one or more processors executing the instructions stored in the system memory to indicate a lane change between lanes of the multi-lane road having travel in the same direction.

10. The system of claim 1, wherein the one or more processors executing the instructions stored in the system memory to formulate a lane level routing plan from the lane level statistics comprises the one or more processors executing the instructions stored in the system memory to formulate a lane level routing by considering a preference for one or more of: reduced travel time, reduced fuel consumption, safety, less traffic, or better visibility.

11. The system of claim 1, wherein the one or more processors executing the instructions stored in the system memory to detect that the vehicle is in a configuration associated with a predicted lane change comprises the one or more processors executing the instructions stored in the system memory to detect that the vehicle is in a configuration associated with a predicted lane change from telemetry data and sensor data.

12. A system, the system comprising:
- one or more processors;
- system memory, the system memory storing instructions that are executable by the one or more processors; and
- the one or more processors executing the instructions stored in the system memory to:
  - send a plan request, including a current configuration of the vehicle and an end vehicle configuration for a motor vehicle, to a statistics module, the statistics module communicatively linked to lane level data for roads having multiple lanes in the same direction of travel, the current configuration and the end configuration separated by a distance;
  - receive lane level statistics from the statistics module for a plurality of roads;
  - identify one or more roads, from among the plurality roads, to be traversed when traveling from the current vehicle configuration to the end vehicle configuration;
  - formulate the lane level routing plan based on the lane level statistics, the lane level routing plan for a route traversing from the current configuration to the end configuration over the one or more roads, the lane level routing plan predicting lane changes on at least one road having multiple lanes in the same direction of travel; and
  - present the lane level routing plan.

13. The system of claim 12, further comprising the one or more processors executing the instructions stored in the system memory to determine the current configuration of the motor vehicle based on telemetry data and sensor data collected at the motor vehicle.

14. The system of claim 13, further comprising the one or more processors executing the instructions stored in the system memory to collect the telemetry data, the telemetry data including one or more of: a location of the motor vehicle, a speed of the motor vehicle, of an acceleration of the motor vehicle.

15. The system of claim 13, further comprising the one or more processors executing the instructions stored in the system memory to collect the sensor data, the sensor data sensed by one or more of: cameras, radar, or LIDAR.

16. The system of claim 12, further comprising the one or more processors executing the instructions stored in the system memory to receive an indication of the end configuration through a user interface at the motor vehicle.

17. A method for use at a vehicle, the method for indicating that the vehicle is to change lanes, the method comprising:

accessing per lane statistics defining statistics for one or more roads including a multi-lane road;

formulating a lane level routing plan from the per lane statistics, the lane level routing plan defining a route from a current configuration of the vehicle to an end configuration of the vehicle over the one or more roads, the lane level routing plan including predicted lane changes during travel between the current configuration and the end configuration;

detecting that the vehicle is in a configuration associated with a predicted lane change; and indicating the predicted lane change on an output device at the vehicle.

18. The method of claim 17, wherein formulating a lane level routing plan from the per lane statistics comprises formulating a lane level routing plan including lane changes predicted to increase the efficiency of travel between the current configuration and the end configuration.

19. The method of claim 18, wherein formulating a lane level routing plan from the per lane statistics comprises formulating a lane level routing by considering a preference for one or more of: reduced travel time, reduced fuel consumption, safety, less traffic, or better visibility.

20. The method of claim 18, wherein indicating the predicted lane change on an output device at the vehicle comprises rendering a visual cue on a user interface at the vehicle.

\* \* \* \* \*